(12) United States Patent
Panizza et al.

(10) Patent No.: US 9,441,727 B2
(45) Date of Patent: Sep. 13, 2016

(54) CONTROL DEVICE FOR A GEARBOX, IN PARTICULAR FOR A MOTOR-VEHICLE GEARBOX, WITH A SYSTEM FOR IDENTIFYING THE ENGAGED GEAR

(71) Applicant: SILA HOLDING INDUSTRIALE S.P.A., Nichelino, Turin (IT)

(72) Inventors: Guido Panizza, Turin (IT); Kamal Mourad, Turin (IT); Edoardo Mongarli, Turin (IT)

(73) Assignee: SILATECH S.r.l., Turin (IT)

( * ) Notice: Subject to any disclaimer, the term of this patent is extended or adjusted under 35 U.S.C. 154(b) by 65 days.

(21) Appl. No.: 14/140,036

(22) Filed: Dec. 24, 2013

(65) Prior Publication Data

US 2014/0109710 A1     Apr. 24, 2014

Related U.S. Application Data

(62) Division of application No. 12/811,194, filed as application No. PCT/IB2009/050123 on Jan. 13, 2009, now Pat. No. 8,616,082.

(30) Foreign Application Priority Data

Jan. 14, 2008 (EP) .................................. 08425017

(51) Int. Cl.

| B60K 20/00 | (2006.01) |
|---|---|
| F16C 1/10 | (2006.01) |
| G05G 9/00 | (2006.01) |
| F16H 59/02 | (2006.01) |
| F16H 59/70 | (2006.01) |
| F16H 61/36 | (2006.01) |

(52) U.S. Cl.
CPC .............. *F16H 59/02* (2013.01); *F16H 59/70* (2013.01); *F16H 61/36* (2013.01); *Y10T 74/2003* (2015.01); *Y10T 74/20018* (2015.01); *Y10T 74/20049* (2015.01); *Y10T 74/20177* (2015.01)

(58) Field of Classification Search
CPC ........ F16H 59/70; F16H 61/36; F16H 59/02; F16H 59/044; F16H 2063/423
See application file for complete search history.

(56) References Cited

U.S. PATENT DOCUMENTS

| 4,592,249 A * | 6/1986 | Lehmann et al. ............ 74/473.1 |
| 5,307,013 A * | 4/1994 | Santos et al. .............. 324/207.2 |
| 6,016,717 A * | 1/2000 | Wheeler .................... 74/473.12 |

(Continued)

FOREIGN PATENT DOCUMENTS

| DE | 101 43 437 A1 | 3/2003 |
| EP | 0 820 926 A2 | 1/1998 |

(Continued)

*Primary Examiner* — William Kelleher
*Assistant Examiner* — Jake Cook
(74) *Attorney, Agent, or Firm* — Sughrue Mion, PLLC

(57) ABSTRACT

A control device includes an elongated mechanical transmission member (10; 110) interposed between the gearbox and a control member (100) for transmitting to the gearbox the commands imparted through the control member, in such a manner that the gear engaged by means of the gearbox is linked to the linear position of the transmission member (10; 110). The device is provided with a position sensor (26; 126) including a movable reference element (28; 128), the movement of which is univocally determined by the movement of a rigid end portion (14; 114) of the transmission member (10; 110), and a stationary detection element (30) for detecting the position of the reference element (28; 128).

5 Claims, 5 Drawing Sheets

(56) References Cited

U.S. PATENT DOCUMENTS

| | | | |
|---|---|---|---|
| 6,316,936 B1* | 11/2001 | Striker et al. | 324/207.21 |
| 6,382,045 B1* | 5/2002 | Wheeler | 74/473.12 |
| 6,569,045 B1 | 5/2003 | Campagnolo | |
| 6,792,821 B1* | 9/2004 | Yamamoto | 74/335 |
| 7,146,871 B2* | 12/2006 | Ozaki et al. | 74/335 |
| 7,395,729 B2 | 7/2008 | Heinrich | |
| 7,426,881 B2 | 9/2008 | Kozu et al. | |
| 2001/0017538 A1* | 8/2001 | Loibl et al. | 324/207.2 |
| 2006/0053943 A1* | 3/2006 | Motonaga et al. | 74/502.4 |
| 2006/0093169 A1* | 5/2006 | Takahashi et al. | 381/182 |
| 2009/0282943 A1 | 11/2009 | Muller | |
| 2011/0025308 A1* | 2/2011 | Kitanaka et al. | 324/207.11 |
| 2011/0041639 A1 | 2/2011 | Brammer et al. | |

FOREIGN PATENT DOCUMENTS

| | | |
|---|---|---|
| EP | 1 154 174 A2 | 11/2001 |
| EP | 1 167 837 A2 | 1/2002 |
| EP | 1 617 107 A2 | 1/2006 |

\* cited by examiner

CONTROL DEVICE FOR A GEARBOX, IN PARTICULAR FOR A MOTOR-VEHICLE GEARBOX, WITH A SYSTEM FOR IDENTIFYING THE ENGAGED GEAR

CROSS-REFERENCE TO RELATED APPLICATIONS

This is a Divisional Application of U.S. application Ser. No. 12/811,194 filed Jun. 29, 2010, which is a National Stage of International Application No. PCT/IB2009/050123 filed Jan. 13, 2009, which claims priority from European Patent Application No. 08425017.4, filed Jan. 14, 2008. The entire disclosures of the prior applications are hereby incorporated by reference.

BACKGROUND OF THE INVENTION

The present invention refers in general to a control device for a gearbox, in particular for a motor-vehicle gearbox, comprising a control lever operable by the driver and at least one elongated mechanical transmission member interposed between the gearbox and the control lever to transmit the engagement commands imparted by the driver through the control lever to at least one engagement member within the gearbox, and more particularly to a system for identifying the engaged gear to be installed in a gearbox control device to provide a signal indicative of the gear currently engaged.

The term "elongated mechanical transmission member" used above is to be intended as referred, in the following description and claims, to any mechanical member able to transmit a command by means of a translational movement. Such a mechanical member may be either a rigid member, typically a rod, or a flexible member, typically a Bowden cable.

U.S. Pat. No. 6,569,45 discloses a control device for a bicycle gearbox including a flexible control cable for transmitting the commands imparted by the rider through a shift lever mounted on the handlebar to a (front or rear) derailleur of the gearbox, as well as a system for identifying the engaged gear, which system comprises a movable member directly secured to the control cable and provided with a movable contact, a tubular housing mounted between two sheath sections within which the control cable is slidable and conductive tracks provided on the surface of a cavity of the housing along which tracks the movable contact is slidable, in such a manner that the linear position of the control cable, and hence the engaged gear, can be assessed by measuring a change in the electrical resistance resulting from the displacement of the movable contact along the tracks. However, such a system for identifying the engaged gear has the drawback that it requires to mount the movable member directly on the control cable and can therefore be used only in a gearbox control device provided with a flexible, push-pull cable, i.e. a flexible cable which is guided both in the pulling direction and in the pushing direction. Therefore, it cannot be installed at the ends (either on the side of the control lever or on the side of the gearbox) of the control cables of the usual control devices for motor-vehicle gearboxes, as these ends are formed by rigid rod-like portions which have to be suitably guided and supported and thus cannot have movable members directly mounted thereon.

EP-A-0 820 926 discloses a control device for a bicycle gearbox including a control cable arranged to transmit to a rear derailleur of the gearbox the commands imparted by the rider through a shift knob mounted on the handlebar and a system for identifying the engaged gear, which system comprises a movable member provided with a magnet directly mounted on the control cable and a contactless magnetic position sensor (including for example a plurality of Hall sensors) arranged to detect the position of the movable member. In addition to the drawback that it cannot be installed on the rigid end portion of a control cable of a gear shift control device of a motor vehicle due to the same reasons as those explained above, the system for identifying the engaged gear which is known from the above-mentioned European Patent application has the drawback that the mounting of a magnetic movable element on a steel control cable involves the magnetization of the cable and hence a loss in the sensitivity of the sensor.

EP-A1 154 174 discloses a control device for a motor-vehicle gearbox comprising a control lever operable by the driver, a servomechanism for assisting the engagement commands imparted by the driver by means of the control lever and a cable connecting the control lever with the servomechanism. The servomechanism comprises an actuating rod, a gear motor for driving the translational movement of the actuating rod under the control of an electronic control unit, a control rod mounted so as to be able to translate parallel to the actuating rod, a connecting lever which is articulated at an intermediate point thereof by means of an articulation pin to the actuating rod, is connected at a first end thereof to the cable and is connected at the opposite end thereof by means of a universal joint to an end of the control rod, and a displacement sensor associated to the end of the control rod opposite to the end connected power rod. When the driver operates the control lever, the electronic control unit controls the motor to generate an assisting force on the actuating rod on the base of the signal provided by the displacement sensor as a result of the displacement of the control rod which is connected to the cable through the connecting lever. Since the connecting lever is not stationary, but moves itself as a result of the movement imparted to the actuating rod by the gear motor, the displacement of the control rod detected by the displacement sensor does not correspond, i.e. is not univocally linked, to the displacement of the cable. The control device therefore requires an additional sensor arranged to provide the electronic control unit with a signal indicative of the engagement position of the gearbox.

SUMMARY OF THE INVENTION

It is an object of the present invention to provide a system for identifying the engaged gear for a control device for a gearbox, in particular for a motor-vehicle gearbox, which is simple, not expensive and reliable, which can be installed on the motor vehicle at any time after the manufacturing without the need to replace existing parts of the control device and which can be used with any control device for a gearbox having at least one elongated mechanical transmission member interposed between the gearbox and a control lever operable by the driver to transmit the engagement commands imparted by the driver through the control lever.

This and other objects are fully achieved according to the invention by virtue of a control device for a gearbox, in particular for a motor-vehicle gearbox, having the characteristics described and claimed herein.

Further advantageous characteristics of the invention are set forth in the dependent claims.

In short, the invention is based on the idea of providing a position sensor arranged to detect the position of an elongated mechanical transmission member, be it either rigid (such as for example a rod) or flexible (such as for example a Bowden cable), which is interposed between the gearbox and the control lever and the position of which is representative of the engaged gear, wherein the position sensor comprises a movable reference element, the movement of which is univocally determined by the movement of the elongated mechanical transmission member, as well as a stationary detection element for detecting the position of the reference element, and wherein the reference element is mechanically connected to a rigid end portion of the mechanical transmission member (either on the side of the control lever or on the side of the gearbox) and is spaced apart from that portion.

According to a first embodiment of the invention, the position sensor is a linear position sensor (of either contact or contactless type) mounted in parallel to the rigid end portion of the mechanical transmission member. In this case, the movable reference element of the position sensor includes a connection portion secured directly to the rigid end portion of the mechanical transmission member and a sliding portion slidably mounted within the stationary detection element along a direction parallel to the axis of the rigid end portion, but spaced apart therefrom. It is thus possible to use a reference element provided with a sliding portion of ferromagnetic material, without the risk of magnetizing the rigid end portion of the mechanical transmission member and hence of negatively affecting the sensitivity of the position sensor. Moreover, thanks to the fact that the reference element is not directly mounted on the rigid end portion of the mechanical transmission member, this latter can be freely guided and supported in the special guide end portion provided in all the common control devices having a flexible cable.

According to a second embodiment of the invention, the position sensor is an angular position sensor and the reference element is a rotatable member connected to the mechanical transmission member via a motion conversion mechanism for converting the translational movement of the mechanical transmission member into a rotational movement of the rotatable member. The same advantages as those indicated above for the first embodiment also apply to the second one.

BRIEF DESCRIPTION OF THE DRAWINGS

Further characteristics and advantages of the invention will become apparent from the following detailed description, given purely by way of non-limiting example with reference to the appended drawings, in which.

DETAILED DESCRIPTION OF THE INVENTION

Figure 1:
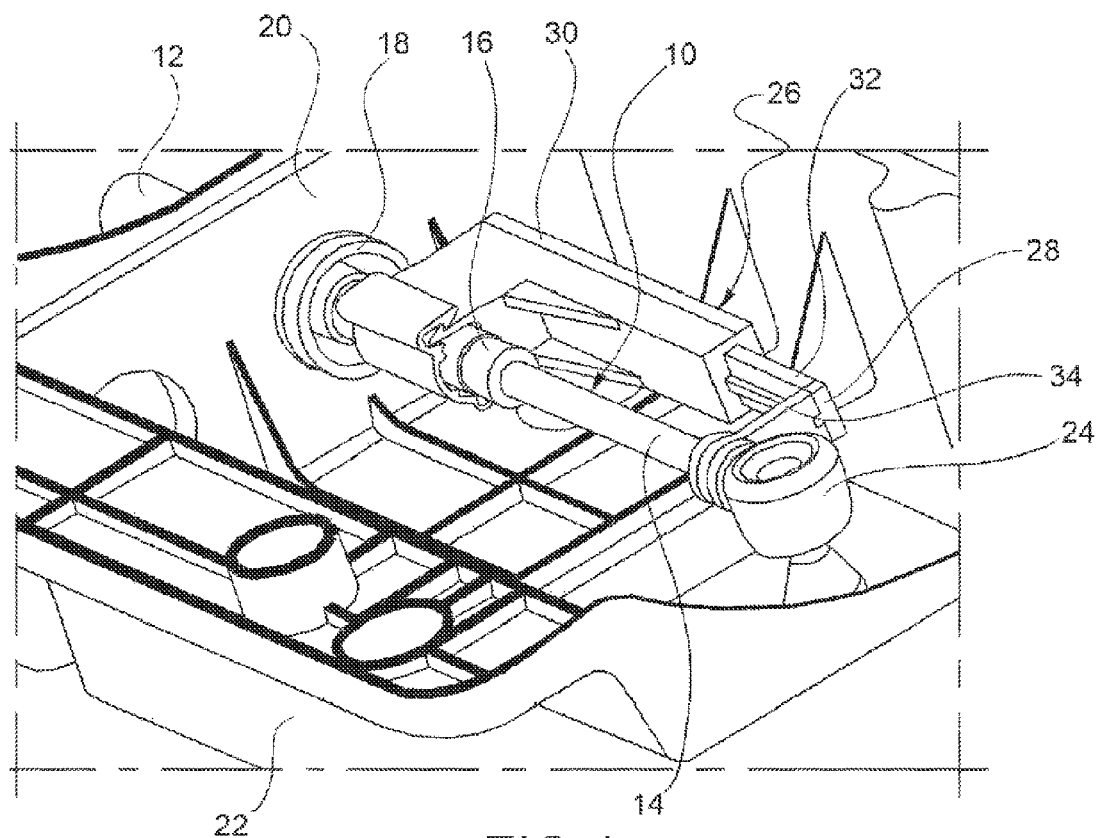
FIGS. 1 and 2 are a perspective view and a plan view, respectively, of a rigid end portion (on the side facing a control lever) of a flexible cable for the transmission of the commands from the control lever to a motor-vehicle gearbox provided with a system for identifying the engaged gear according to a first embodiment of the invention.
Figure 2:
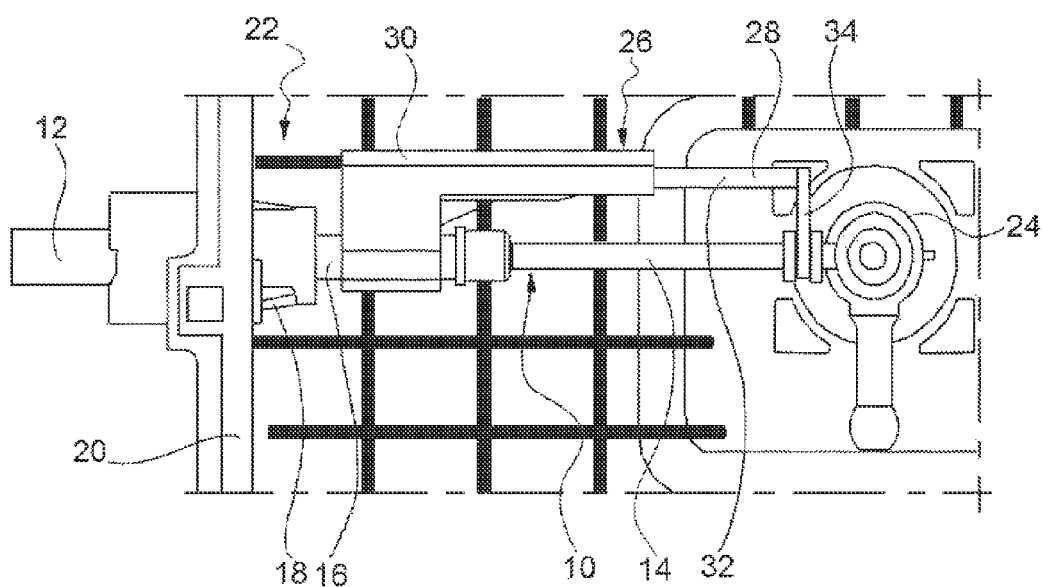

With reference first to FIGS. 1 and 2, a control device for a motor-vehicle gearbox includes a flexible elongated mechanical transmission member which is generally indicated 10 and is arranged to transmit the engagement commands imparted by the driver, through a control lever (per-se-known and not shown) manually operable by the driver, to an actuating member inside the gearbox (also per-se-known and not shown). In the illustrated example, the flexible elongated mechanical transmission member 10 is a Bowden cable including a sheath 12 and a flexible tension wire (not shown) slidably received within the sheath 12. At the control lever-side end of the tension wire there is attached a rigid rod-like element 14, part of which is slidably received in a guide sleeve 16 carried by an end connection member 18 mounted in a wall 20 of a support structure 22 for supporting the control lever. At its free end projecting from the guide sleeve 16, the rod-like element 14 is connected to the control lever through a ball joint 24 in such a manner that the forward and backward tilting movements of the control lever in the engagement direction (corresponding to the longitudinal direction of the vehicle in a traditional H-type gearbox) are converted into forward and backward sliding movements of the rod-like element 14, and hence of the tension wire. In each of the selection planes, the control lever can assume first and second engagement positions, that is, a forward position and a backward position, respectively, in either of which one respective gear is engaged, as well as a neutral intermediate position in which no gear is engaged. Each of the above-mentioned positions of the control lever in the engagement direction univocally corresponds to a respective linear position of the rod-like element 14.

In particular, when so-called start-and-stop engine management systems are used, which cause the engine to stop when the vehicle is in neutral in order to obtain a reduction in the fuel consumption of the vehicle, it is fundamental to precisely identify the neutral condition of the vehicle. To this end, the control device according to the invention is provided with a system for identifying the engaged gear which basically comprises a linear position sensor 26 mounted in parallel to the rod-like element 14 to detect the linear position of that element, and hence of the tension wire attached thereto, and thus to provide an electronic control unit (not shown) with a signal indicative of the engaged gear.

In the example illustrated in FIGS. 1 and 2, the linear position sensor 26 is of the contact type, but might of course be of the contactless type as well. The sensor 26 includes a movable reference element 28 drivingly connected for translation with the rod-like element 14 and a stationary detection element 30 provided with electrically conductive tracks (not shown) in order to detect the position of the movable reference element 28, and hence of the rod-like element 14. According to the illustrated embodiment, the movable reference element 28 has an L-shaped configuration and includes a sliding portion 32 which is slidably arranged within the stationary detection element 30 and is provided with a movable contact (not shown) sliding on the electrically conductive tracks of the stationary detection element 30, and a connection portion 34 secured directly to the rod-like element 14. Accordingly, the movement of the movable reference element 28 is univocally determined by the movement of the rod-like element 14. Further constructional and functional details of the linear position sensor 26 are not described herein, as they are widely known to the skilled person.

By virtue of the movable reference element 28 of the linear position sensor 26 being drivingly connected for translation with the rod-like element 14, and hence with the tension wire of the Bowden cable, the sensor 26 detects the current position of the tension wire and provides the electronic control unit with a corresponding signal on the base of which the unit is able to ascertain the engaged gear. Moreover, since the rod-like element 14 of the Bowden cable does not slide directly within the stationary detection element 30, but the stationary detection element 30 detects the position of a movable reference element 28 mounted in parallel to the rod-like element 14, the rod-like element 14 can be freely guided and supported in the guide sleeve 16.

As mentioned above, the contact linear position sensor might of course be replaced with a contactless linear position sensor, which will also have a movable reference element drivingly connected for translation with the rod-like element 14 of the Bowden cable, as well as a stationary detection element mounted on the guide sleeve 16 or on another stationary component of the control device. It is possible for example to use a magnetic system, in which the movable reference element is provided with a magnet and the stationary detection element is provided with Hall sensors. In this case, since a sliding portion of the movable reference element is not directly mounted on the rod-like element, it is possible to avoid problems of loss in the sensitivity of the linear position sensor due to the magnetization of the rod-like element.

It is however possible to use any other type of contactless sensor, for example an analogical or digital radiofrequency sensor. In this case, the movable reference element will be provided with a reflecting antenna and the stationary detection element will be provided with a modulator, a demodulator and a radiofrequency signal transmitter.

A system for identifying the engaged gear having a linear position sensor such as the one described above might also be applied to a control device for a motor-vehicle gearbox having a rigid elongated mechanical transmission member, such as a rod, as in this case it would be sufficient to drivingly connect the movable detection element of the sensor for translation with the rod and to mount the stationary reference element of the sensor on a stationary component either of the control device or of the gearbox.

Figure 3:
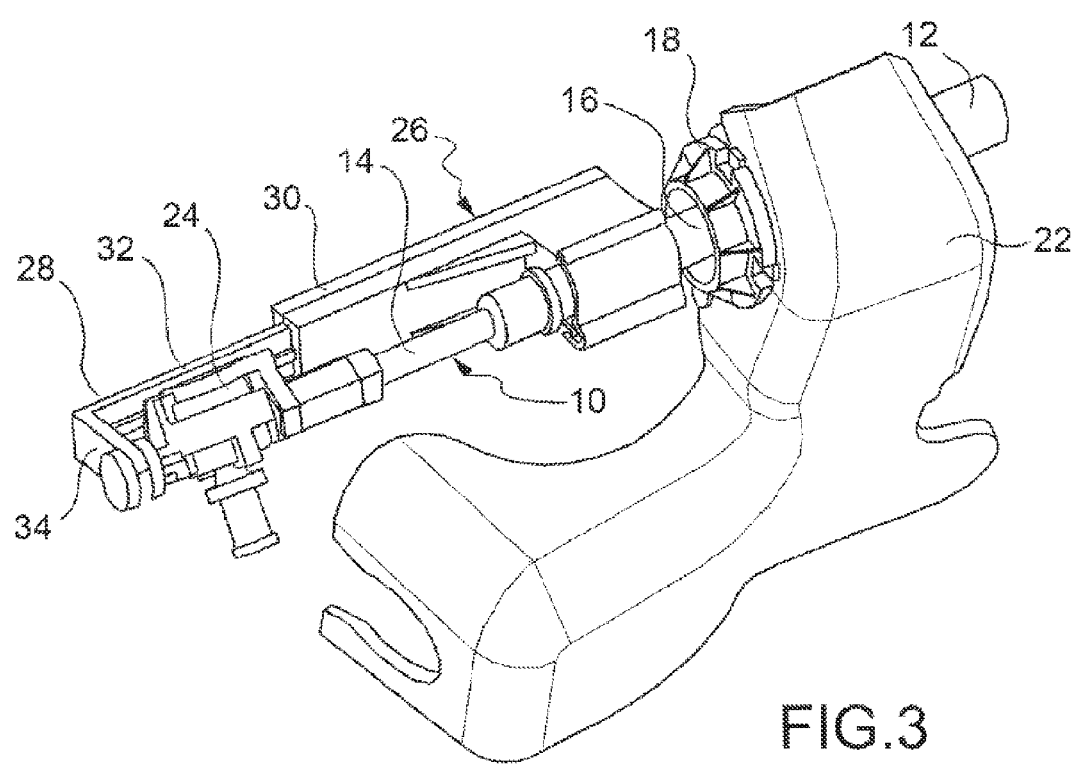
FIG. 3 is a perspective view of a rigid end portion (on the side facing the gearbox) of a flexible cable for the transmission of the commands from the control lever to a motor-vehicle gearbox provided with a system for identifying the engaged gear according to a first embodiment of the invention.

An example of mounting of the linear position sensor 26 at the gearbox-side end of an elongated mechanical transmission member of a control device for a motor-vehicle gearbox is illustrated in FIG. 3, where parts and elements identical or corresponding to those of FIGS. 1 and 2 have been given the same reference numerals.

Also in this case the transmission member 10 is a Bowden cable including a sheath 12 and a flexible tension wire (not shown) slidable received within the sheath 12. Part of a rigid rod-like element 14 secured to an end of the tension wire is slidably received in a guide sleeve 16 carried by an end connection member 18 mounted in a support structure 22 fixed to the gearbox. At its free end projecting from the guide sleeve 16, the rod-like element 14 is connected through a ball joint 24 to an actuating member (not shown) inside the gearbox in such a manner that the sliding movements of the tension wire, and hence of the rod-like element 14, in either directions are converted into translational or tilting movements of the actuating member in either directions. The linear position sensor 26 includes a movable reference element 28 drivingly connected for translation to the rod-like element 14 and a stationary detection element 30 secured to the guide sleeve 16 and arranged to detect the position of the movable reference element 28, and hence of the rod-like element 14. According to the illustrated embodiment, the movable reference element 28 has an L-shaped configuration and includes a sliding portion 32 slidably arranged within the stationary detection element 30 and a connection portion 34 secured directly to the rod-like element 14, in such a manner that the movement of the movable reference element 28 is univocally determined by the movement of the rod-like element 14, i.e. of the control lever.

A second embodiment of a system for identifying the engaged gear for a control device for a motor-vehicle gearbox according to the invention, which includes a control lever 100 (of which only a lower end portion is shown) manually operable by the driver and an elongated mechanical transmission member 110 arranged to transmit the engagement commands imparted by the driver through the control lever 100 to an actuating member inside the gearbox, will be described now with reference to the example illustrated in FIGS. 4 to 6. According to this example, the transmission member 110 is a Bowden cable including a sheath 112 and a flexible tension wire (which cannot be seen in the figures) slidably received within the sheath 112. At the control lever-side end of the tension wire there is attached a rigid rod-like element 114, which is connected at its free end to the control lever 100 through a ball joint 124, in such a manner that the forward and backward tilting movements of the control lever 100 in the engagement direction (corresponding to the longitudinal direction of the vehicle in a traditional H-type gearbox) are converted into forward and backward sliding movements of the rod-like element 114, and hence of the tension wire.

Figure 4:
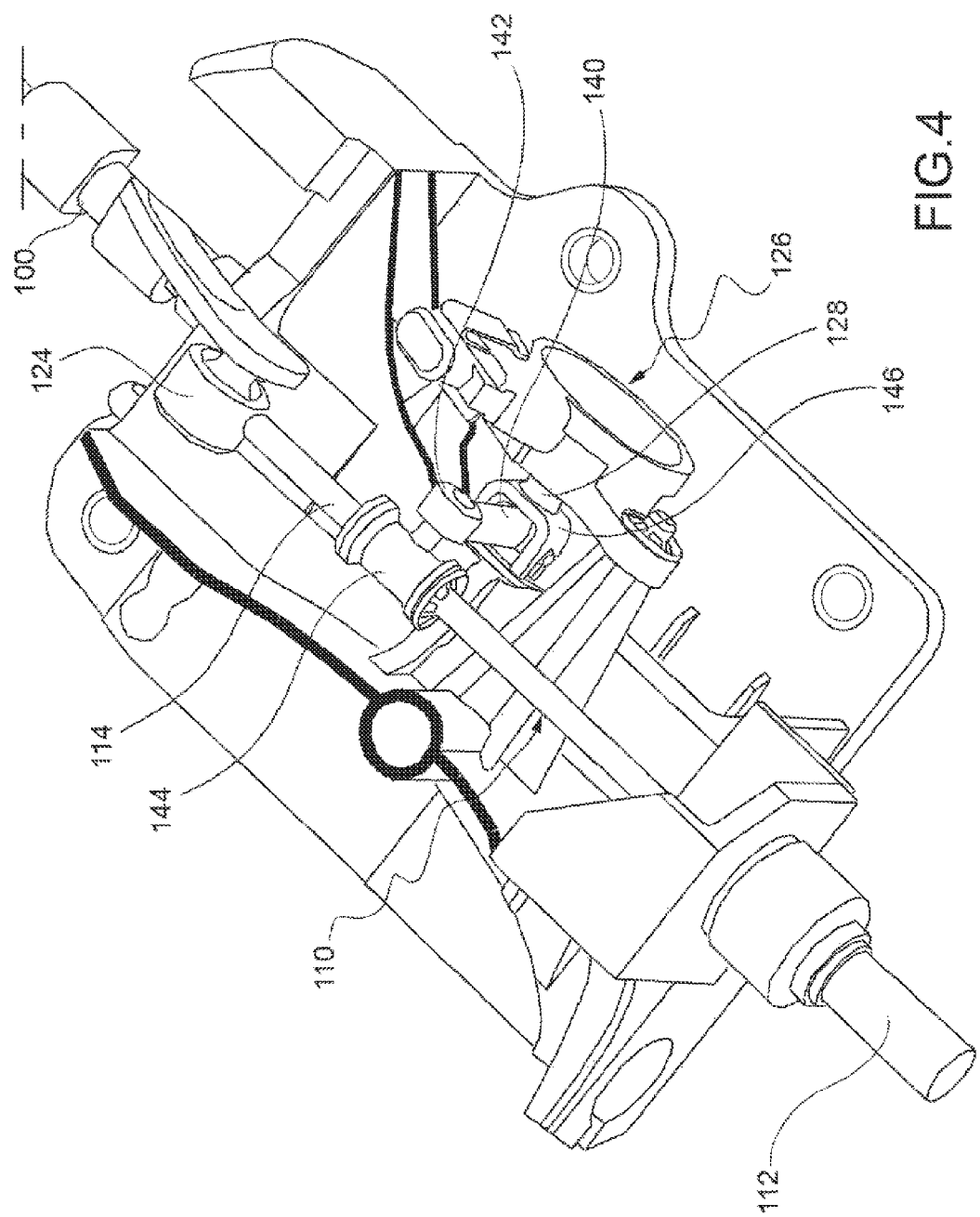
FIGS. 4, 5 and 6 are a perspective view, a plan view and a side elevation view, respectively, of a rigid end portion (on the side facing the control lever) of an elongated mechanical transmission member for the transmission of the commands from the control lever to a motor-vehicle gearbox provided with a system for identifying the engaged gear according to a second embodiment of the invention.
Figure 5:
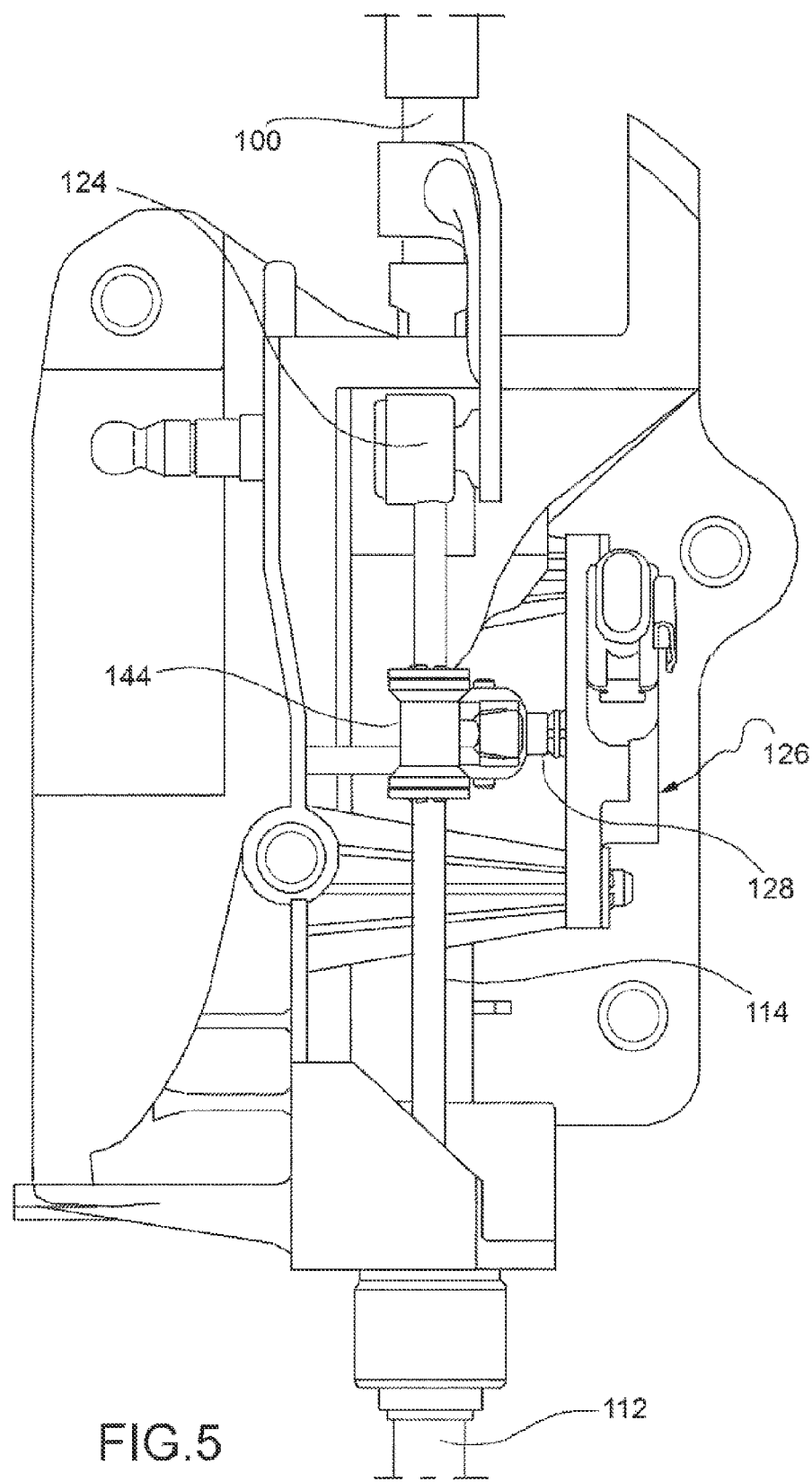
Figure 6:
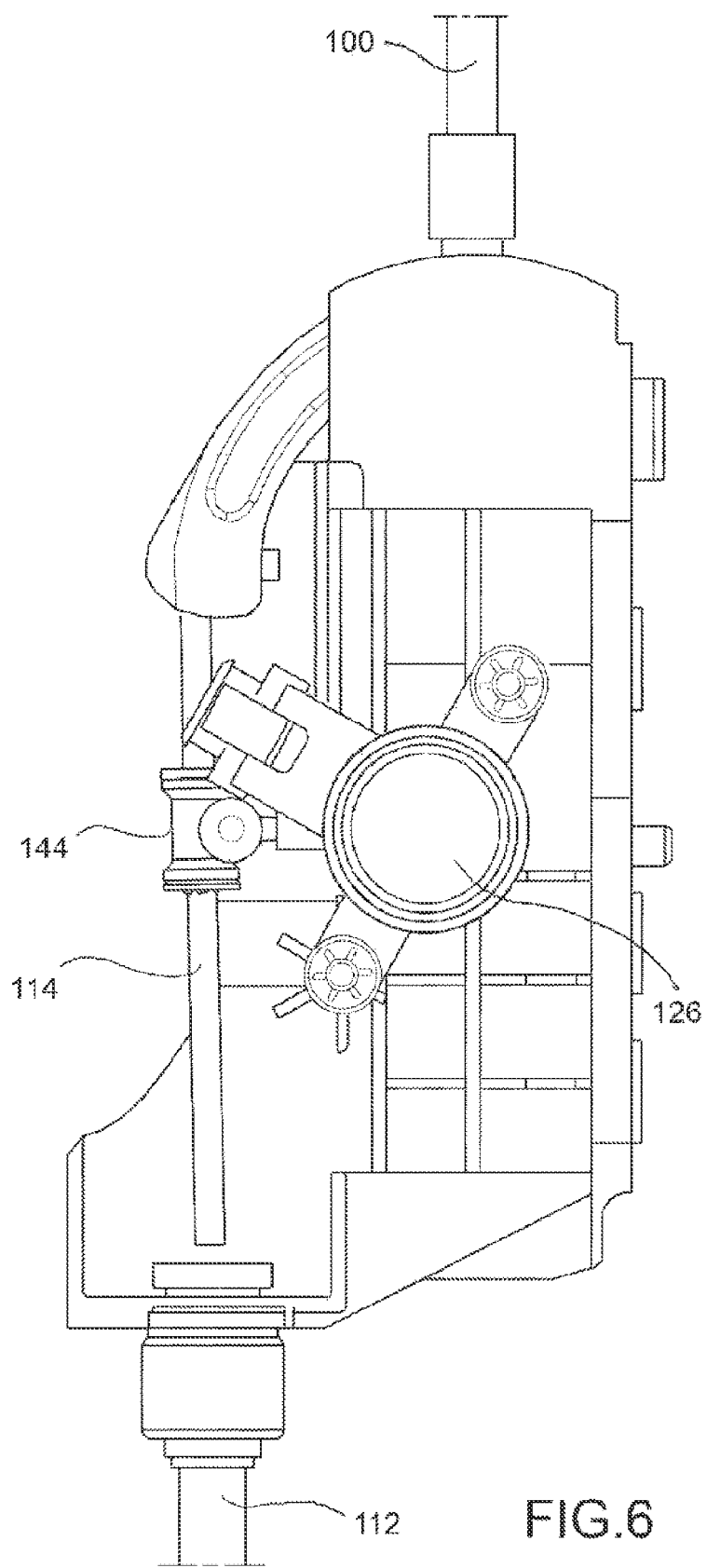

In the system for identifying the engaged gear according to FIGS. 4 to 6, an angular position sensor 126 is used which detects the angular position of a rotatable reference element 128 connected to the rod-like element 114 via a motion conversion mechanism for converting the translational movement of the rod-like element 114 into a rotational movement of the reference element 128. More specifically, the motion conversion mechanism includes a shaft 140 connected at an end thereof by means of a ball joint 142 to a sleeve 144 secured to the rod-like element 114 and at the opposite end thereof by means of a gimbal joint 146 to the rotatable member 128. The connection by gimbal joint 146 between the shaft 140 and the reference element 128 allows displacements of the rod-like element 114 in a direction perpendicular to the sliding direction as a result of displacements of the control lever 100 in the transverse direction among the various (usually three) selection planes. By virtue of the connection through the motion conversion mechanism, the (rotational) movement of the reference element 128 is univocally determined by the (translational) movement and the rod-like element 114, i.e. of the control lever of the gearbox. The angular position sensor 126 detects directly the angular position of the reference element 128 and hence indirectly the linear position of the rod-like element 114. The electronic control unit is therefore able to ascertain the engaged gear on the base of the position signal provided by the angular position sensor 126. Also in this case, the constructional and functional details of the sensor 126 are omitted, as they are well known to the skilled person.

The arrangement with an angular position sensor can be equally well applied to a control device for a motor-vehicle gearbox having a rigid elongated transmission member, even though the arrangement with a linear position sensor described above with reference to FIGS. 1 to 3 is preferable for reasons of size, simplicity of construction and cost.

Naturally, the principle of the invention remaining unchanged, the embodiments and constructional details may vary widely with respect to those described and illustrated purely by way of non-limiting example.

For example, instead of being manual, the control device might also be robotized, in which case the elongated mechanical transmission member would be interposed between the gearbox and an actuator which is controlled by the electronic control unit governing the operation of the gearbox.

The invention claimed is:

1. A control device for a gearbox, comprising an elongated mechanical transmission member interposed between the gearbox and a control member for transmitting to the gearbox the commands imparted through the control member, in such a manner that the engaged gear is linked to the linear position of the transmission member, wherein the transmission member includes a rigid end portion, wherein the device is provided with a linear position sensor comprising a movable reference element and a stationary detection element arranged to detect the linear position of the reference element, wherein the movable reference element is mechanically connected to the rigid end portion and spaced apart from it, so as to be connected for translation with the transmission member, wherein the transmission member is a flexible transmission member including a sheath and a tension wire slidably received within the sheath, the rigid end portion having a rod-like element attached to an end of the tension wire, and a guide sleeve for guiding said rod-like element, and wherein the stationary detection element is mounted on the guide sleeve.

2. The device of claim 1, wherein the linear position sensor is a contact linear position sensor, the stationary detection element being provided with electrically conductive tracks and the movable reference element being provided with a movable contact sliding on the electrically conductive tracks of the stationary detection element.

3. The device of claim 1, wherein the linear position sensor is a contactless magnetic sensor, the movable reference element being provided with a magnet and the stationary detection element being provided with Hall sensors.

4. The device of claim 1, wherein the linear position sensor is a contactless analogical or digital radiofrequency sensor, the movable reference element being provided with a reflecting antenna and the stationary detection element being provided with a modulator, a de-modulator and a radiofrequency signal transmitter.

5. The device of claim 1, wherein the movable reference element has an L-shaped configuration and includes a sliding portion which is slidably arranged within the stationary detection element and a connection portion rigidly connected to the rigid end portion.

* * * * *